US007742008B2

(12) United States Patent
Wang et al.

(10) Patent No.: US 7,742,008 B2
(45) Date of Patent: Jun. 22, 2010

(54) MULTIPOLE ANTENNAE FOR LOGGING-WHILE-DRILLING RESISTIVITY MEASUREMENTS

(75) Inventors: Tsili Wang, Katy, TX (US); Jack Signorelli, Cypress, TX (US)

(73) Assignee: Baker Hughes Incorporated, Houston, TX (US)

( * ) Notice: Subject to any disclaimer, the term of this patent is extended or adjusted under 35 U.S.C. 154(b) by 32 days.

(21) Appl. No.: 11/877,976

(22) Filed: Oct. 24, 2007

(65) Prior Publication Data

US 2008/0158082 A1 Jul. 3, 2008

Related U.S. Application Data

(60) Provisional application No. 60/865,931, filed on Nov. 15, 2006.

(51) Int. Cl.
*H01Q 7/08* (2006.01)
*H01Q 9/16* (2006.01)
*G01V 3/08* (2006.01)

(52) U.S. Cl. ........................ 343/788; 343/793; 324/338

(58) Field of Classification Search ................. 343/787, 343/788, 793; 324/338, 303, 388
See application file for complete search history.

(56) References Cited

U.S. PATENT DOCUMENTS 3,305,771 A * 2/1967 Arps .......................... 324/342
4,511,843 A * 4/1985 Thoraval .................... 324/338
4,659,992 A 4/1987 Clark et al.
4,837,517 A 6/1989 Barber
4,933,638 A 6/1990 Kenyon et al.
4,968,940 A 11/1990 Clark et al.
5,157,605 A 10/1992 Chandler et al.
5,329,235 A 7/1994 Zhou et al.
5,339,036 A 8/1994 Clark et al.
5,452,761 A 9/1995 Beard et al.
5,453,693 A 9/1995 Sinclair et al.
5,469,062 A 11/1995 Meyer, Jr.
5,530,358 A 6/1996 Wisler et al.
5,892,361 A 4/1999 Meyer, Jr. et al.
5,923,167 A * 7/1999 Chang et al. ................ 324/303
6,163,155 A 12/2000 Bittar
6,218,842 B1 4/2001 Bittar et al.
6,466,441 B1 10/2002 Suzuki
6,509,738 B1 1/2003 Minerbo et al.
6,703,837 B1 3/2004 Wisler et al.
6,819,110 B2 11/2004 Omeragic et al.
6,900,640 B2 5/2005 Fanini et al.

(Continued)

OTHER PUBLICATIONS

H.G. Doll, "Introduction to Induction Logging and Application to Logging of Wells Drilled with Oil-Base Mud", Journal of Petroleum Transactions AIME, vol. 1. p. 148-162 (1949).

(Continued)

*Primary Examiner*—Shih-Chao Chen
(74) *Attorney, Agent, or Firm*—Cantor Colburn LLP

(57) ABSTRACT

A multipole antenna for conducting logging-while-drilling (LWD), includes a wire for one of producing and receiving an electromagnetic field, the wire having at least one winding for providing a magnetic moment in a first portion of the antenna that is opposite to the magnetic moment of a second portion of the antenna. A method for constructing the multipole antenna is provided. A LWD tool making use of the antenna is also provided.

16 Claims, 5 Drawing Sheets

U.S. PATENT DOCUMENTS

| | | | |
|---|---|---|---|
| 7,057,392 B2 | 6/2006 | Wang et al. | |
| 2002/0105332 A1 | 8/2002 | Rosthal et al. | |
| 2005/0150655 A1 | 7/2005 | Duong et al. | |
| 2005/0189945 A1 | 9/2005 | Reiderman | |

OTHER PUBLICATIONS

Barber, "Introduction to the Phasor Dual Induction Tool", Society of Petroleum Engineers. pp. 1699-1705, Sep. 1985.
Barber, "Invasion Profiling with the Phasor Induction Tool" SPWLA Twenty-Seventh Annual Logging Symposium, pp. 1-14, Jun. 9-13, 1986.
Anderson et al., "Strange Induction Logs-A. Catalog of Environmental Effects", SPWLA Twenty-Eight Annual Logging Symposium, pp. 1-16, Jun. 29-Jul. 2, 1987.
Kienitz, et al. "Accurate Logging in Large Boreholes", SPWLA Twenty-Seventh Annual Logging Symposium, pp. 1-21, Jun. 9-13, 1986.
Meyer, et al., "A New Slimhole Multiple Propagation Resistivity Tool", SPWLA 35th Annual Logging Symposium; Jun. 19-22, 1994. 1-21; USA.
Franz, "Downhole Recording System for MWD", SPE 10054, Oct. 1981. 9 pages.
Rodney et al., "Electromagnetic Wave Resistivity MWD Tool", SPE Drilling Engineering, Oct. 1986. pp. 337-346.
Coope et al. "Formation Evaluation Using Measurements Recorded While Drilling", SPWLA Twenety-Fifth Annual Logging Symposium, Jun. 1984. pp. 1-21.
Coope, et al. "The Theory of 2 MHz Resistivity Tool and Its Application to Measurement-While-Drilling", The Log Analyst, May-Jun. 1984. pp. 35-46.
Hendricks et al., "MWD: Formation Evaluation Case Histories in the Gulf of Mexico", SPE 13187, Sep. 1984. pp. 1-5 with 10 sheets of figures.
Holbrook, "The Effect of Mud Filtrate Invasion on the EWR Log-A Case History", SPWLA Twenty-Sixth Annual Logging Symposium, Jun. 1985. pp. 1-29.
Coope et al., "Formation Evaluation Using EWR Logs", SPE 14062, Mar. 1986. pp. 415-425.
The Patents Act 1977 (as amended), UK Intellectual Property Office. Dec. 13, 2007. pp. 1-94.
Grief et al., "Petrophysical Evaluation of Thinly Bedded Reservoirs in High Angle/Displacement Development Wells with the NL Recorded Lithology Logging System", The Log Analyst, Sep.-Oct. 1986. pp. 29-38.
Gianzero et al., "A New Resistivity Tool for Measurement-While-Drilling", SPWLA Twenty-Sixth Annual Logging Symposium, Jun. 17-20, 1985. pp. 1-22.
Elkington, et al. "Invasion Profile From the Digital Induction Log", SPWLA Twenty-Sixth Annual Logging Symposium, Jun. 17-20, 1985. pp. 1-17.
R. Fagin et al., "MWD Resistivity Tool Guides Bit Horizontally in Thin Bed", Oil and Gas Journal, vol. 89. Issue 49. Dec. 9, 1991.
Zhou, Q., et al. "Geometric Factor and Adaptive Deconvolution of MWD-PWR Tools", The Log Analyst, Jul.-Aug. 1992, pp. 390-398.
Zhou, Q., et al., MWD Resistivity Tool Response in A Layered Medium, Geophysics, vol. 56, No. 11 (Nov. 1991), pp. 1738-1748.
Ball, S., et al, "Formation Evaluation Utilizing a New MWD Multiple Depth of Investigation Resistivity Sensor", Fifteenth European Formation Evaluation Symposium (May 5-7, 1993). pp. 1-27.
S. Gianzero, et al. "Determining the Invasion Near the Bit with the MWD Toroid Snode", SPWLA Twenty-Seventh Annual Logging Symposium, pp. 1-17, Jun. 9-13, 1986.
T. I. F. Grupping et al., "Performance Update of a Dual-Resistivity MWD Tool with some Promising Results in Oil Based Mud Applications", SPE 18115 pp. 73-85, Oct. 2-5, 1988 Houston, Tex.
T.I.F. Grupping et al., "Recent Performance of the Dual-Resistivity MWD Tool", SPE Formation Evaluation, pp. 171-176, Jun. 1990.
Meyer, W.H., et al., "Near-Bit Propagation Resistivity for Reservoir Navigation", SPE 28318 69th Annual Technical Conference and Exhibition, New Orleans, La. U.S.A. Sep. 25-28, 1994.
Meyer, "2MHz Propagation Resistivity Modeling in Invaded Thin Beds", The Log Analyst, Jul.-Aug. 1993, p. 33.
Meyer, "Inversion of 2 MHz Propagation Resistivity Logs" Society of Professional Well Log Analysts, 33rd Annual Logging Symposium, Jun. 14-17, 1992. pp. 1-21.
Shen, L.C, et al. "Dielectric properties of reservoir rocks at ultra-high frequencies", Geophysics, vol. 50 No. 4, pp. 692-704, Apr. 1985.
Ott, H.W., Noise Reduction Techniques in Electronic Systems, A Wiley-Interscience Publication, pp. 165-172.
"Well Logging", McGraw-Hill Encyclopedia of Science & Technology, vol. 19. pp. 439-446, 7th Edition, 1992.
M.R. Taherian, et al., "Measurement of Dielectric Response of Water Saturated Rocks", Geophysics vol. 55. No. 12 (Dec. 1990) pp. 1530-1541.
Mack, S., et al, "MWD tool accurately measures four resistivities," Oil & Gas Journal. May 25, 1992. vol. 90. Issue 21. 4 pages.
"Effects of Asymmetric Borehole and Invasion on MWD Resistivity Measurements in Drilling Horizontal Wells", J-Q. Wu, et al., progress in Electromagnetic Research Symposium, Psadena, Ca, (Jul. 14, 1993) (Abstract Only).
J-Q. Wu, et al., "Effects of Eccentering MWD Tools on Electromagnetic Resistivity Measurements", Society of Professional Well Log Analysis, 31st Annual Logging Symposium, (Jun. 24-27, 1990). pp. 1-15.
Zhu, T. et al., "Two-dimensional Velocity Inversion and Synthetic Seismogram Computation," Geophysics, vol. 52, No. 1, Jan. 1987; p. 37-50.
Bittar, M. et al, "The Effects of Rock Anisotropy on MWD Electromagnetic Wave Resistivitiy Sensors," The Log Analyst, Jan.-Feb. 1996, p. 20-30.
Hagiwara, T., "A New Method to Determine Horizontal-Resistivity in Anisotropic Formations without Prior Knowledge of Relative Dip," 37th SPWLA Annual Logging Symposium, New Orleans, LA, Jun. 16-19, 1996, p. 1-5 and three pages of figures.
Bittar, "A Multiple Depth of Investigation Electromagnetic Wave Resistivity Sensor: Theory, Experiment and Prototype Field Test Results," SPE Formation Evaluation, Sep. 1993. pp. 171-176.
International Search Report for International Application No. PCT/US07/84621, Mailed on Apr. 9, 2008.

* cited by examiner

--PRIOR ART--

-- PRIOR ART --

MULTIPOLE ANTENNAE FOR LOGGING-WHILE-DRILLING RESISTIVITY MEASUREMENTS

CROSS-REFERENCE TO RELATED APPLICATIONS

This application claims priority to U.S. Ser. No. 60/865,931 filed Nov. 15, 2006, the entire disclosure of which is incorporated herein by reference in it's entirety.

BACKGROUND OF INVENTION

1. Field of the Invention

The present invention relates to equipment for making resistivity measurements while drilling a wellbore, and in particular, the invention relates to multipole antennas.

2. Description of the Related Art

Electromagnetic induction and wave propagation logging tools are commonly used for determination of electrical properties of formations surrounding a borehole. These logging tools give measurements of apparent resistivity (or conductivity) of the formation that, when properly interpreted, reasonably determine the petrophysical properties of the formation and the fluids therein.

The physical principles of electromagnetic induction resistivity well logging are described, for example, in H. G. Doll, Introduction to Induction Logging and Application to Logging of Wells Drilled with Oil-Based Mud, Journal of Petroleum Technology, vol. 1, p. 148, Society of Petroleum Engineers, Richardson, Tex. (1949). Many improvements and modifications to electromagnetic induction resistivity instruments have been devised since publication of the Doll reference, supra. Examples of such modifications and improvements can be found, for example, in U.S. Pat. No. 4,837,517 issued to Barber; U.S. Pat. No. 5,157,605 issued to Chandler et al.; and U.S. Pat. No. 5,452,761 issued to Beard et al.

A typical electrical resistivity-measuring instrument is an electromagnetic induction military well logging instrument such as described in U.S. Pat. No. 5,452,761, issued to Beard et al. The induction logging instrument described in the Beard '761 patent includes a number of receiver coils spaced at various axial distances from a transmitter coil. Alternating current is passed through the transmitter coils, which induces alternating electromagnetic fields in the earth formations. Voltages, or measurements, are induced in the receiver coils as a result of electromagnetic induction phenomena related to the alternating electromagnetic fields. A continuous record of the voltages form curves, which are also referred to as induction logs. The induction instruments that are composed of multiple sets of receiver coils are referred to as multi-array induction instruments. Every set of receiver coils together with the transmitter is named as a subarray. Hence, a multi-array induction consists of numerous subarrays and acquires measurements with all the subarrays.

Logging-while-drilling resistivity tools employ loop antennas to transmit and receive electromagnetic signals into and from surrounding formations, respectively. These signals provide for determination of resistivity and other electromagnetic properties of the formations. The loop antennas can have magnetic moments pointing parallel or transverse to an axis for the tool (or in any other direction). Such antennas are usually called monopole antennas because they have unidirectional magnetic moments. However, for certain applications, multipole antennas are needed. A multipole antenna can be a dipole, a quadrupole, etc.

For instance, a dipole antenna has the capability of providing the azimuthal direction information of a remote bed relative to the wellbore (Minerbo et al., U.S. Pat. No. 6,509,738). Conceptually, a dipole antenna consists of two spaced apart monopoles with one pointing to one direction and the other to the opposite direction. A quadrupole antenna consists of two spaced apart dipoles. The two dipoles point to the opposite direction.

What are needed are techniques for providing multipole antennae for conducting logging while drilling.

BRIEF DESCRIPTION OF THE INVENTION

Disclosed is a multipole antenna for conducting logging-while-drilling (LWD), the antenna including: a wire for one of producing and receiving an electromagnetic field, the wire including at least one winding for providing a magnetic moment in a first portion of the antenna that is opposite to the magnetic moment of a second portion of the antenna.

Also provided herein is an axially oriented multipole antenna for a well logging tool, the antenna including: a wire for one of producing and receiving an electromagnetic field, the wire including at least one winding for providing a magnetic moment in a first portion of the antenna that is opposite to the magnetic moment of a second portion of the antenna; wherein the wire is disposed about a circumference of the tool.

In addition, a transversely oriented multipole antenna for well logging, is provided. The transversely oriented multipole antenna includes a wire for one of producing and receiving an electromagnetic field, the wire including at least one winding for providing a magnetic moment in a first portion of the antenna that is opposite to the magnetic moment of a second portion of the antenna; wherein the wire is disposed about a length of the tool.

Further disclosed is a method for constructing a multipole antenna for conducting logging-while-drilling (LWD), including: selecting a wire for producing the antenna; fabricating the antenna by providing at least one winding in the wire such that when the antenna is used for one of producing and receiving an electromagnetic field, the wire provides for a magnetic moment in a first portion of the antenna that is opposite to the magnetic moment of a second portion of the antenna.

In addition, a tool for performing logging-while-drilling (LWD), is provided and includes a multipole antenna including a wire for one of producing and receiving an electromagnetic field, the wire including at least one winding for providing a magnetic moment in a first portion of the antenna that is opposite to the magnetic moment of a second portion of the antenna.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Figure 1:
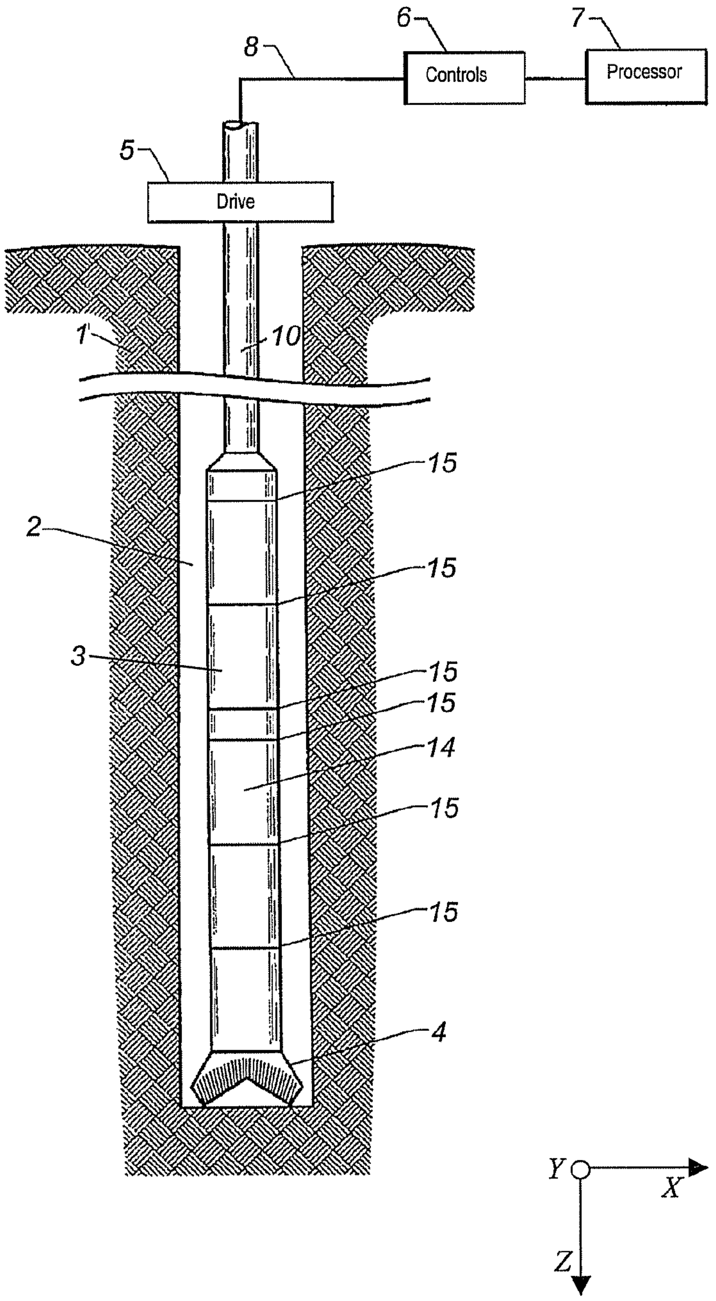
FIG. 1 depicts an apparatus for conducting logging while drilling.

Referring now to FIG. 1, there are shown aspects of an exemplary embodiment of a tool 3 for conducting "logging-while-drilling" (LWD). The tool 3 is included within a drill string 10 that includes a drill bit 4. The drill string 10 provides for drilling of a wellbore 2 into earth formations 1. The drill bit 4 is attached to a drill collar 14.

As a matter of convention herein and for purposes of illustration only, the tool 3 is shown as traveling along a Z-axis, while a cross section of the tool 3 is realized along an X-axis and a Y-axis.

A drive 5 is included and provides for rotating the drill string 10 and may include apparatus for providing depth control. Control of the drive 5 and the tool 3 is achieved by operation of controls 6 and a processor 7 coupled to the drill string 10. The controls 6 and the processor 7 may provide for further capabilities. For example, the controls 6 are used to power and operate sensors (such as antenna) of the tool 3, while the processor 7 receives and at least one of packages, transmits and analyzes data provided by the tool 3.

Considering the tool 3 now in greater detail, in this embodiment, the tool 3 includes a plurality of multipole antenna 15. The multipole antennae 15 are constructed in accordance with the teachings herein. In the present embodiment, each multipole antenna 15 is exposed around a circumference of the drill collar 14 and provides for a 360 degree view of the surrounding earth formations 1. Each of the multipole antennae 15 are configured to provide for at least one of transmitting and receiving of electromagnetic signals. In this embodiment, the axes of these multipole antennae 15 are coincident with an axis of the drill collar 14. Typically, the multipole antennae wire 15 are electrically insulated from and slightly recessed within the outer diameter of the drill collar 14 and are essentially an integral element of the drill collar 14 assembly.

Although it is considered that the tool 3 is generally operated with supporting components as shown (i.e., the controls 6 and the processor 7), one skilled in the art will recognize that this is merely illustrative and not limiting. For example, in some embodiments, the tool 3 includes at least one on-board processor 7. In some other embodiments, the drill string 10 includes a power supply for powering, among other things, the multipole antennae 15. As these other components are generally known in the art, these components are not discussed in greater detail herein.

Figure 2:
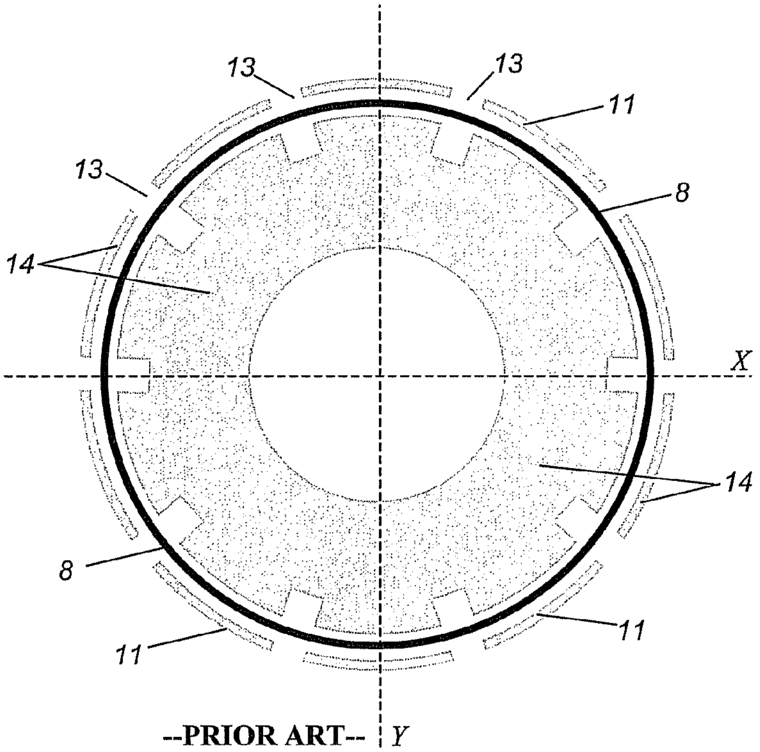
FIG. 2 depicts a cross section of tool, showing aspects of a prior art resistivity antenna.

Referring now to FIG. 2, aspects of an embodiment of a prior art resistivity antenna 8 is shown. As shown in FIG. 2, use of a typical prior art antenna 8 calls for providing multiple slots 13 in an outer surface 11 of the drill collar 14. The slots 13 are aligned along an axial direction and spaced apart circumferentially. A wire is run through the slots as the prior art antenna 8. Due to the high conductivity of the drill collar 14 (which is metal), the segments of wire embedded in the drill collar 14 do not transmit or receive signals to or from the surrounding earth formations 1. The segments of the prior art antenna 8 that cross the slots 13 provide for signal generation and reception.

Embodiments of multipole antenna 15 as disclosed herein include aspects of prior art antennae 8. In one embodiment, depicted in FIG. 3, the multipole antenna 15 is axially oriented (i.e., disposed about a circumference of the tool) and includes a plurality of individual coils 21 placed in each of the slots 13. In some embodiments, ferrite or other magnetic materials are inserted beneath each of the coils 21. Reference may be had to FIG. 4.

Referring now to FIG. 4, a cross section of a logging-while-drilling (LWD) multipole antenna 15 built on a drill collar 14 is depicted. FIG. 4 depicts a metal portion of the drill collar 14, an area including magnetic materials (such as ferrite), and an area including a filler 22 that is a non-conducting material (such as an epoxy). The multipole antenna 15 is shown in the cross sectional view as being a wire. Use of the ferrite or other magnetic material beneath each multipole antenna 15 (shown in FIG. 4 as a wire, but in some embodiments, the multipole antenna 15 includes the coil 21 or other similar structures) provides for increasing the efficiency of the multipole antenna 15. A void space of the slot 13 is filled with the non-conducting filler 22 material. Multipole antennae 15 as depicted in FIG. 4 may be used for either one of transmission and reception of electromagnetic energy.

Figure 3:
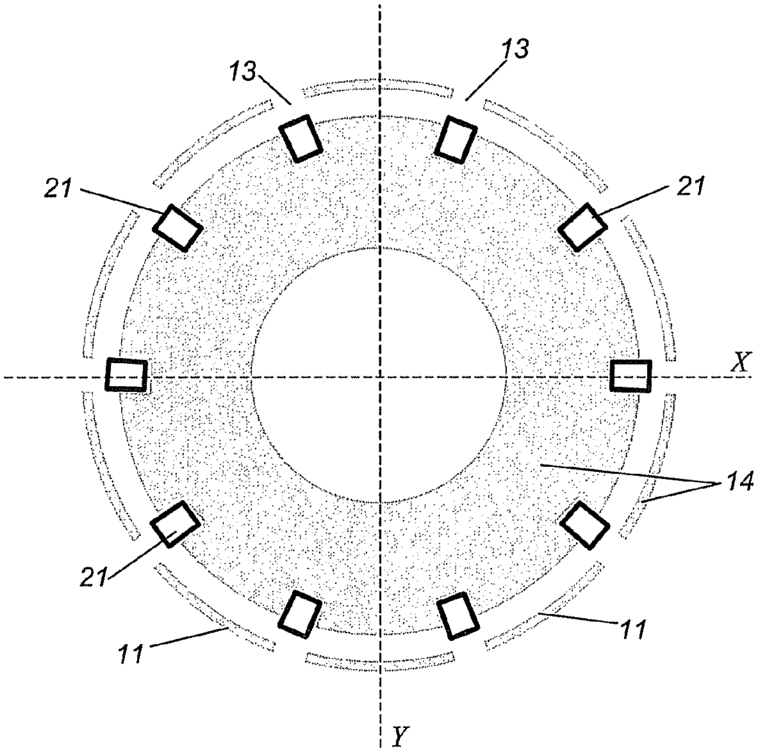
FIG. 3 depicts aspects of one embodiment for a multipole antenna according to the teachings herein.
Figure 4:
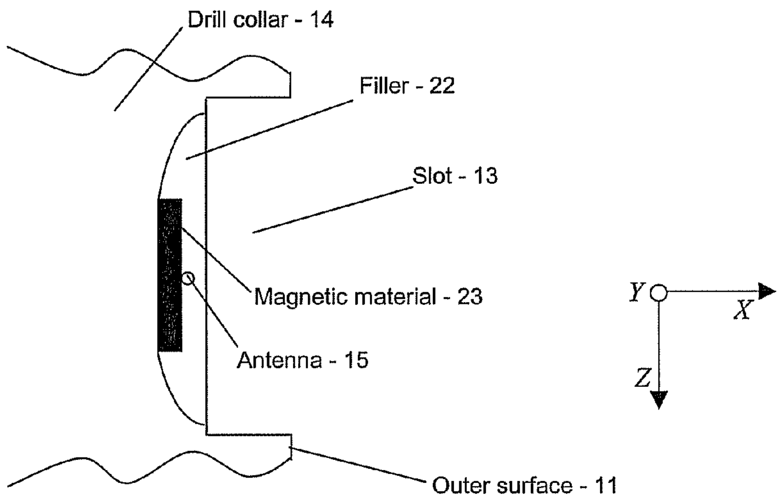
FIG. 4 illustrates aspects of the multipole antenna shown in FIG. 3.

To construct a multipole antenna 15 of the embodiment depicted in FIG. 3, some of the individual coils 21 have a moment direction that is opposite to the moment direction of other individual coils 21.

In typical embodiments, providing the plurality of coils 21 with a plurality of moment directions calls for providing coils 21 having different construction. For example, the antenna wire for one set of coils 21 within the plurality is wound differently than the wire in another set of coils 21 within the plurality.

Figure 5:
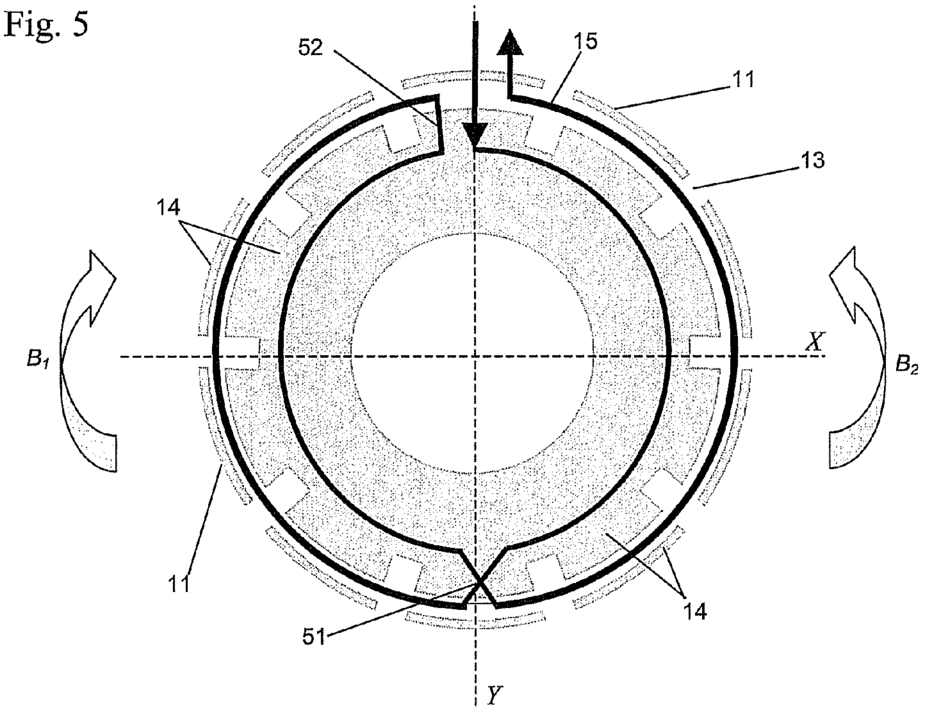
FIG. 5 depicts aspects of another embodiment of the multipole antenna.

Consider the multipole antenna 15 having a dipole as depicted in FIG. 5. Note that FIG. 5 shows one example of constructing the multipole antenna 15, and that multipole antenna 15 of higher orders can be constructed in a manner similar to the teachings of FIG. 5.

With reference to FIG. 5 and the dipole antenna, consider that the drill collar 14 includes 2N slots 13 (where, for this depiction, N=5). The slots 13 are evenly distributed along the outer surface 11 of the drill collar 14. In this embodiment, N consecutive slots 13 have a first magnetic field $B_1$ having a moment in a first direction, while the remaining N consecutive slots 13 have a second magnetic field $B_2$ having a moment in a direction that is opposite to the first direction. For purposes of illustration, the direction of the first magnetic field $B_1$ and the second magnetic field $B_2$ are provided by the directional arrows.

One way to generate magnetic moments of opposite directions is to run current in the wires of the multipole antenna 15 in opposite directions. As shown in FIG. 5, a winding 51 may be used to accomplish this task. The single winding 51 shown in FIG. 5 provides for the dipole embodiment, where the direction of the first magnetic field $B_1$ and the second magnetic field $B_2$ are opposite to each other. As with the embodiment depicted in FIG. 4, magnetic materials 23 may be placed in each slot 13 beneath (i.e., behind) the wire. Depending upon a design of the multipole antenna 15, the winding 51 may be accompanied by a return 52. In these embodiments, the winding 51 provides for redirecting current in the multipole antenna 15, while the return 52 provides for returning the current to an original or another orientation.

Stated another way, the winding 51 provides for changing an orientation of the magnetic moment, while the return 52 provides for returning the magnetic moment to an original or another orientation. One skilled in the art will recognize that a plurality of windings 51 and returns 52 may be had. Note that the term "winding" does not necessarily mean the antenna wire is wound in the traditional sense. That is, the winding may simply be realized as a crossover. In some embodiments, the wires in the crossover have some degree of separation from each other.

Figure 6:
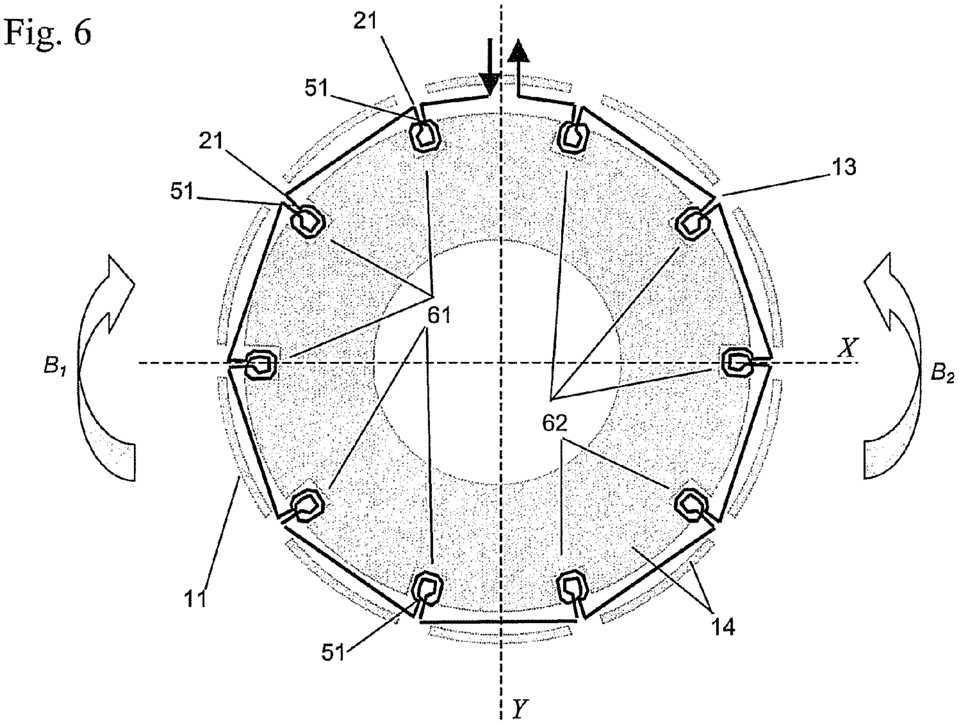
FIG. 6 depicts aspects of a further embodiment of the multipole antenna.

A variation of the embodiment shown in FIG. 5 is depicted in FIG. 6. In FIG. 6, another embodiment of the multipole antenna 15 is depicted. The embodiment of FIG. 6 is another dipole antenna. In FIG. 6, the 2N slots 13 are divided into two groups separated by the Y-axis. In this depiction, a first set of slots 61 (of N in number) is on a left side of the Y-axis, while a second set of slots 62 (also N in number) is on a right side of the Y-axis. The antenna wire in the first set of slots 61 is wound in an opposite direction to the wire in the second set of slots 62. In this embodiment, the antenna wire may be wound around a ferrite containing material in each slot 13.

This arrangement provides for the multipole antenna 15. More specifically, current in the first set of slots 61 travels in a clockwise direction, whereas the current in the second set of slots 62 travels in a counter clockwise direction. This results in an opposing magnetic moment between the first set of slots 61 and the second set of slots 62.

Figure 7:
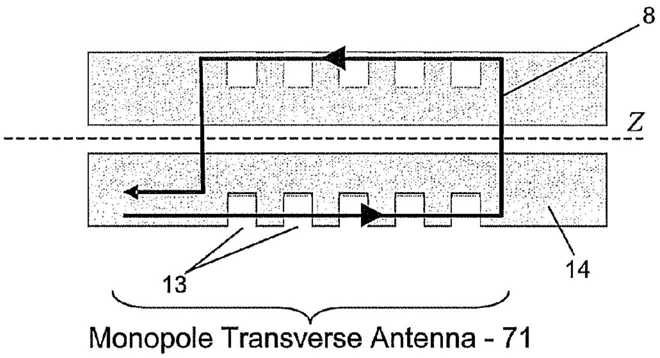
FIG. 7 depicts aspects of a prior art transverse antenna.

FIG. 7 illustrates a monopole transverse antenna of the prior art. In this embodiment, the slots 13 are cut in the circumferential direction (normal to the tool axis). The prior art resistivity antenna 8 of this depiction is referred to as a monopole transverse antenna 71.

Figure 8:
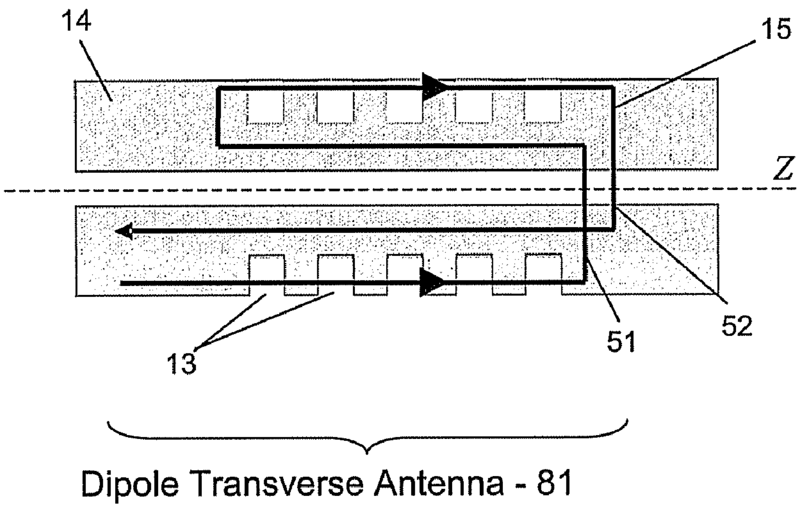
FIG. 8 depicts a dipole transverse antenna according to the teachings herein.

FIG. 8 provides an improvement upon the monopole transverse antenna 71 depicted in FIG. 7. In FIG. 8, a dipole transverse antenna 81 is depicted. The dipole transverse antenna 81 of this embodiment is provided for by running current in the upper and lower wires in the opposite directions. As with the embodiment of FIG. 5, it may be considered that a winding 51 and a return 52 provide for the dipole transverse antenna 81. Also, as with other embodiments, ferrite or other magnetic materials 23 may be inserted beneath the antenna wire to increase efficiency of the antenna 15. Wiring of the antenna 15 in a manner that is similar to that depicted in FIG. 6 may also be used to construct additional embodiments of the dipole transverse antenna 81. In general, the transverse antenna 81 is mounted along a length of the well logging tool 3.

One skilled in the art will recognize that the multipole antenna disclosed herein may be used in a variety of orientations. For example, the multipole antenna disclosed herein may be used in an orientation other than axial or transverse with relation to the tool 3.

Figure 9:
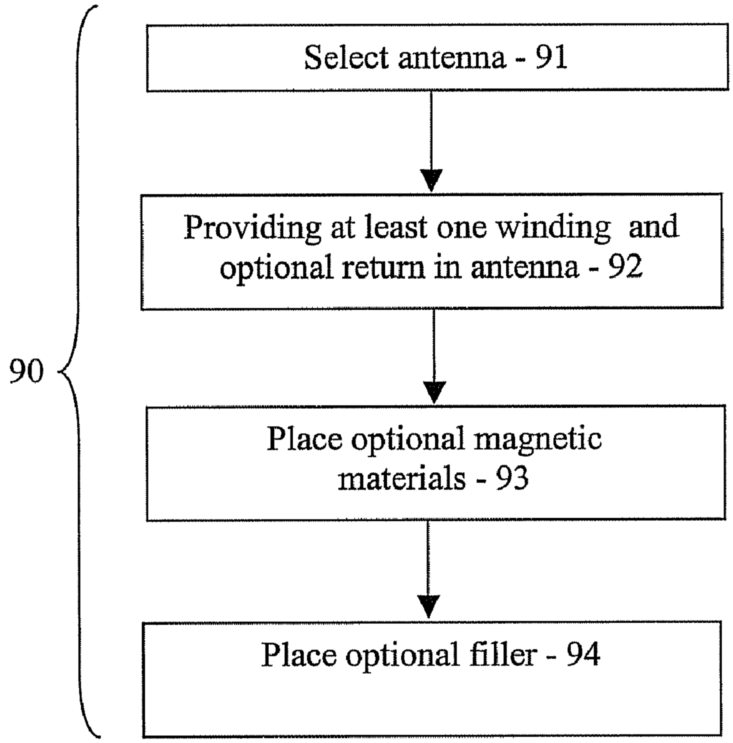
FIG. 9 depicts aspects of an exemplary method for constructing a multipole antenna.

FIG. 9 depicts aspects of an exemplary method for constructing the multipole antenna 90. The method for constructing the multipole antenna 90 calls for selecting an antenna design 91, fabricating the antenna 92 by providing at least one winding 51 and an optional return 52, optionally placing magnetic materials 93 behind the antenna wire (in some embodiments, a coil 21 in the antenna wire) and optionally placing filler material 94 around void spaces.

The capabilities of the present invention can be implemented using software, firmware, hardware or some combination thereof. As one example, one or more aspects of the present invention can be included in an article of manufacture (e.g., one or more computer program products) having, for instance, computer usable media. The media has embodied therein, for instance, computer readable program code means for providing and facilitating the capabilities of the present invention.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, aspects of the steps may be performed in a differing order, steps may be added, deleted and modified as desired. All of these variations are considered a part of the claimed invention.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A multipole antenna for conducting logging-while-drilling (LWD), the antenna comprising:

a single wire for one of producing and receiving an electromagnetic field, the wire comprising at least one winding for providing a magnetic moment in a first portion of the antenna that is opposite to the magnetic moment of a second portion of the antenna.

2. The multipole antenna of claim 1, wherein the at least one winding comprises a plurality of windings for providing a corresponding plurality of opposing magnetic moments.

3. The multipole antenna of claim 1, further comprising a coupling for coupling the antenna to a source of current for the producing.

4. The multipole antenna of claim 1, further comprising a coupling for coupling the antenna to electronics for the receiving.

5. The multipole antenna of claim 1, further comprising a return for changing an orientation of the magnetic moment.

6. The multipole antenna of claim 1, further comprising magnetic materials in an orientation to the wire.

7. The multipole antenna of claim 1, further comprising a filler material in an orientation to the wire.

8. An axially oriented multipole antenna for a well logging tool, the antenna comprising:

a single wire for one of producing and receiving an electromagnetic field, the wire comprising at least one winding for providing a magnetic moment in a first portion of the antenna that is opposite to the magnetic moment of a second portion of the antenna;

wherein the wire is disposed about a circumference of the tool.

9. A transversely oriented multipole antenna for a well logging tool, the antenna comprising:

a single wire for one of producing and receiving an electromagnetic field, the wire comprising at least one winding for providing a magnetic moment in a first portion of the antenna that is opposite to the magnetic moment of a second portion of the antenna;

wherein the wire is disposed about a length of the tool.

10. A method for constructing a multipole antenna for conducting logging-while-drilling (LWD), the method comprising:

selecting a single wire for producing the antenna;

fabricating the antenna by providing at least one winding in the wire such that when the antenna is used for one of producing and receiving an electromagnetic field, the wire provides for a magnetic moment in a first portion of the antenna that is opposite to the magnetic moment of a second portion of the antenna.

11. The method as in claim 10, further comprising providing a return for changing an orientation of the magnetic moment.

12. The method as in claim 10, further comprising disposing magnetic materials in an orientation to the wire.

13. The method as in claim 10, further comprising disposing a filler material in an orientation to the wire.

14. The method as in claim 10, further comprising providing a coupling for coupling the antenna to a source of current for the producing.

15. The method as in claim 10, further comprising providing a coupling for coupling the antenna to electronics for the receiving.

16. A tool for performing logging-while-drilling (LWD), the tool comprising:

a multipole antenna comprising a single wire for one of producing and receiving an electromagnetic field, the wire comprising at least one winding for providing a magnetic moment in a first portion of the antenna that is opposite to the magnetic moment of a second portion of the antenna.

* * * * *